March 4, 1952     S. T. LESTER     2,588,131
MEASURING AND MARKING HEIGHT INDICATOR
Filed Feb. 6, 1947
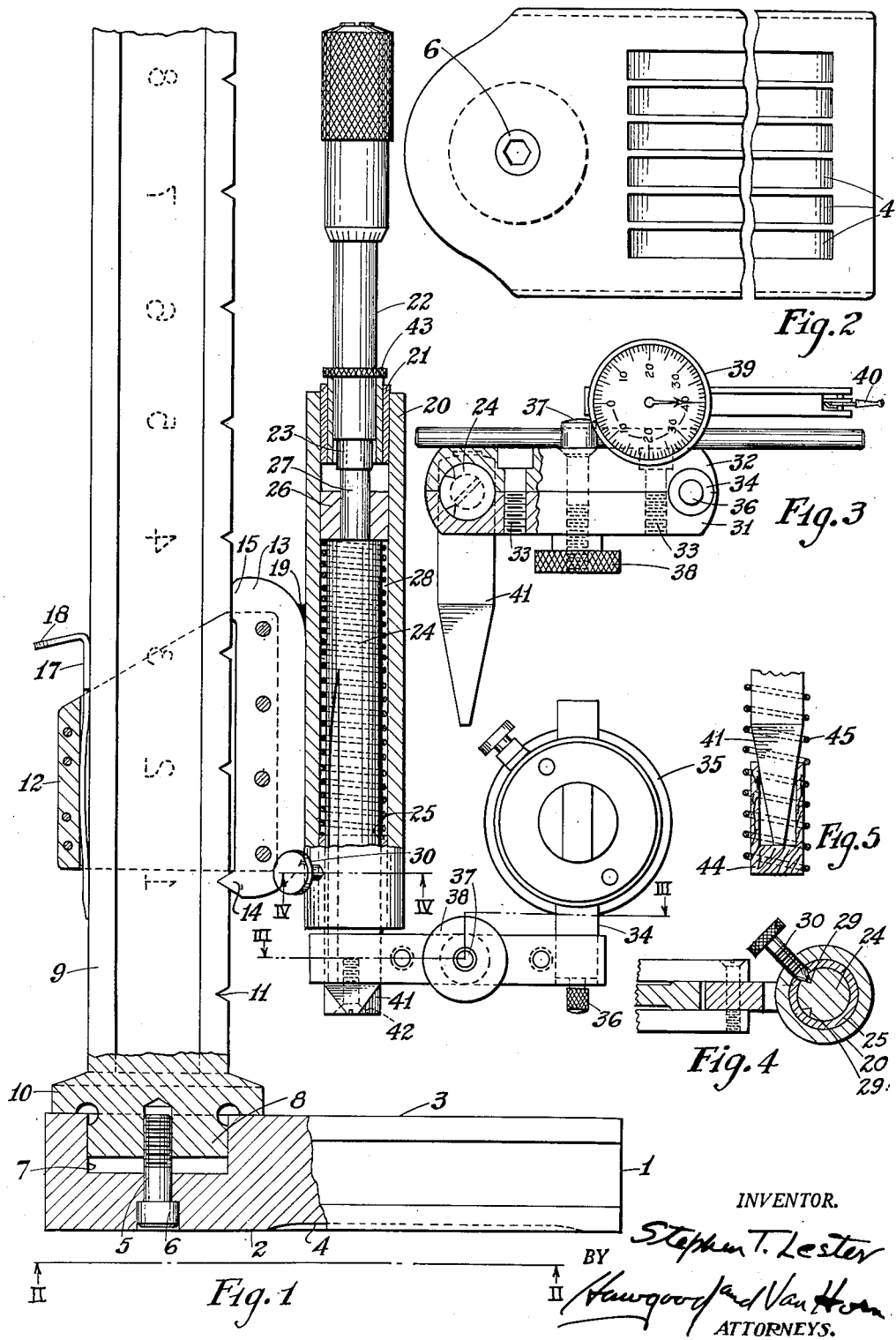
INVENTOR.
Stephen T. Lester
BY Hawgood and Van Horn
ATTORNEYS.

Patented Mar. 4, 1952

2,588,131

UNITED STATES PATENT OFFICE 2,588,131

MEASURING AND MARKING HEIGHT INDICATOR

Stephen T. Lester, Cleveland Heights, Ohio

Application February 6, 1947, Serial No. 726,801

3 Claims. (Cl. 33—170)

This invention relates to measuring apparatus and particularly to apparatus which is very useful in obtaining accurate measurements throughout a considerable range.

An object of the invention is to provide an improved measuring apparatus which will be extremely accurate throughout the entire range of its capacity.

Another object of the invention is to provide an improved measuring apparatus which may easily be used.

Another object of the invention is to provide an improved measuring apparatus which may be used to give actual measurements or to compare a plurality of articles.

Another object of the invention is to provide an improved measuring apparatus which may be adjusted to preclude any possibility of distortion.

Another object of the invention is to provide an improved measuring apparatus which will be simple in construction.

Another object of the invention is to provide an improved measuring apparatus which will be composed of few and rugged parts.

Another object of the invention is to provide an improved measuring apparatus which may be manufactured easily and economically.

Another object of the invention is to provide an improved measuring apparatus which will be neat and attractive in appearance.

Another object of the invention is to provide an improved measuring apparatus in which moving parts will be protected from dirt.

Other objects will hereinafter appear.

This invention will be better understood from the description of one practical embodiment thereof, illustrated in the accompanying drawings, in which;

Figure 1 is a side elevational view, parts being broken away and shown in section, of one form of device embodying my invention;

Figure 2 is a fragmentary bottom plan view of the device of Figure 1;

Figure 3 is a fragmentary transverse sectional view taken on the line III—III of Figure 1, and showing the device provided with a different type of indicator;

Figure 4 is a fragmentary transverse sectional view taken on the line IV—IV of Figure 1; and Figure 5 is a fragmentary view of the end of the scriber illustrated in the preceding figures, showing one manner of protecting the same when not in use.

The height gage shown on this application is an improvement upon, and a carrying forward of, instruments of some of my prior patents, being in some respects the lineal descendant of these shown on my Patents Nos. 1,949,280, issued February 27, 1934, and 2,207,625, issued July 9, 1940; and while both my prior instruments are extremely accurate and are in extensive use, the present invention provides a number of additional advantages, particularly in simplicity of operation, over its proto-types.

The gage shown herein consists of a base 1, which is a generally rectangular block having a flat lower surface 2 and a parallel flat upper surface 3, the lower surface being recessed by a number of parallel grooves 4 into which particles of dirt may be scraped when the base is placed upon a support such as surface block, machine tool table, or the like.

The base is perforated for the passage of a screw 5, the perforation terminating in a relatively small recess for the reception of the head 6 of the screw at the lower side of the block, and in a larger cylindrical recess 7 extending from the upper side of the block and in which is received a cylindrical pilot 8 formed integrally with, or permanently fixed to, an upwardly extending blade or frame 9, the juncture between the pilot and blade being formed into an annular flange or shoulder 10 the lower side of which is plane and rests firmly upon the plane upper surface 3 of the base.

The side edges of the blade, of course, are adjusted to be at right angles to the planes of the surfaces 2 and 3 of the base, and either or both edges of the blade may be notched as indicated at 11, the notches being V-shaped and spaced to locate accurately a carrier 12 which embraces the blade and is provided with a contacting bearing member 13.

The bearing member 13 has at one end a projecting V-shaped tooth, projection, or lug 14, adapted to engage selectively any of the notches 11, and at the other end the bearing member is formed into a flattened projection or lug 15 which engages the edge of the blade intermediate notches 11.

A flat or leaf spring 17, having an angularly extending gripping end 18, is inserted between the edge of the blade opposite that engaged by member 13 and the interior of the carrier and holds lugs 14 and 15 firmly (and under a predetermined pressure) in contact respectively with the sides of a notch 11 and with an internotch portion of the blade edge engaged by the lug 15.

Permanently fixed to the carrier as by welding 19 is a cylindrical tubular sleeve 20, the axis of the sleeve being normal to the planes of surfaces 2 and 3 and therefore parallel to the edges of the beam, and carried by the upper end of this sleeve, as in bushing 21, is an adjustable element shown as a micrometer head 22 having a movable shank or anvil 23 which projects into the upper end of cylinder 20 below the bushing 21.

Within the sleeve 20, below the micrometer head and spaced from the inner surface of the sleeve, is a generally cylindrical plunger 24, the lower end of which has a close sliding fit within a bushing 25, the upper end of the plunger being provided with an enlarged head 26.

The head 26 has a projecting contact 27 in alignment with the anvil 23 of the micrometer head, which may well be an extension of the plunger shank 24.

In the annular space between plunger 24 and cylinder 20, and shown with its lower end bearing on the top of bushing 25 and its upper end bearing on the under side of plunger head 26, is a coiled compression spring 28 which holds the contact 27 firmly in engagement with the anvil 23 of the micrometer head.

The plunger 24 is provided with a plurality of elementally extending grooves 29, being shown in the drawing, and one of these selectively may be engaged by the end of a set screw 30 threaded through the sleeve 20 and bushing 25.

Fixed to the bottom of plunger 24 is a supporting bracket, which, as best seen in Figure 3, consists of two generally similar bars 31 and 32 clamped together by screws 33, the bars being semicylindrically recessed to clamp the lower end of the plunger between them at one end.

Adjacent their other ends, the bars have semicylindrical recesses by which they may clamp the stem 34 of a dial indicator 35, the anvil 36 of the indicator extending through this stem to below the bottom of the bars.

A screw 37 with a perforated head and a knurled nut 38 is arranged to clamp other apparatus to the side of the supporting bracket. In Figure 3, these parts are shown as holding the supporting arm of a feeler indicator 39, so that its contact 40 projects substantially beyond the end of the bracket arm.

A scriber 41 is shown as secured to the bottom of plunger 24 by a machine screw 42, this scriber having a sharp elongated chisel like point, which preferably is parallel to the planes of surfaces 2 and 3.

It will be understood that the notches 11 are spaced apart by some convenient distance, as, for instance one inch, if a one inch micrometer head be used at 22, or one centimeter if a metric micrometer head be used, and that the micrometer head will be adjusted in bushing 21 and locked in position by nut 43 so that when the micrometer head reads 0 and the carrier 14 is properly engaged with the notch 11, the lower surface of indicator anvil 36 and the edge of scriber 41 will lie in the same horizontal plane and both will be an exact and equal number of inches from surfaces 2 and 3.

Of course, the plane surfaces 2 and 3 are not only in parallel horizontal planes, but are in planes spaced apart by one or more equal units of measurement, as for instance one inch for a device measuring in inches, or a plurality of centimeters for a metric instrument.

The plunger 24, with its rigidly attached bracket arm 31—32, scriber 41, and indicators 35 and/or 39, can all be rotated about the axis of the plunger simply by loosening set screw 30 to withdraw its end from groove 29, turning the plunger, and tightening the set screw to engage another groove 29.

Thus, with the parts as shown and the grooves substantially 90° apart, the instrument may be used as illustrated in Figure 1, with indicator 35 extending to the right, or, upon readjustment the scriber may be caused to project in this direction, and the indicator be moved to a position at one side to be out of the way while the scriber is in use.

When more than two instruments are carried upon bracket 31—32, additional grooves 29 may be provided which will permit any of them being brought into operative position merely by adjusting the set screw 30.

The indicator 39 is particularly useful in comparing articles, rather than obtaining exact measurements, as it may be angularly adjusted about the axis of bolt 37 and thus may be placed with its contact 40 on one of the articles to be compared, adjusted until it read 0 or some other selected pre-determined reading, and then moved to other articles, upon which the reading of the indicator will indicate the differences in measurement of the articles from the first one.

In Figure 5 a guard for the scriber shown consisting of a cup shaped cap 44, and a helical spring 45, which embraces a part of the cap and also the shank of the scriber 41, so that the guard protects the end of the scriber from damage while it also prevents its sharp edge from injuring the user.

While I have described the illustrated embodiment of my invention in some particularity, obviously many other embodiments, variations and modifications will readily occur to those skilled in this art, and I do not therefore limit myself to the precise details shown and described, but claim as my invention all embodiments, variations, and modifications coming within the scope of the appended claims.

I claim:

1. Measuring apparatus comprising a blade, a carrier thereon including a tubular portion with its axis parallel to the edges of the blade, a measuring device fixed to the carrier, a cylindrical plunger slidable within the tubular portion of the carrier engageable with the measuring device, the plunger having attaching means for attachment thereto of a plurality of instruments disposed angularly with respect to each other about the axis of the plunger, selective feathering means between the carrier and the plunger permitting the plunger to move axially within the tubular portion in any of a plurality of angular positions whereby any of said devices may selectively be brought into a desired projecting position relative the carrier.

2. Measuring apparatus comprising a blade, a carrier thereon including a tubular portion with its axis parallel to the edges of the blade, a measuring device fixed to the carrier and extending into such tubular portion, a cylindrical plunger within said tubular portion, resilient means urging said plunger against said measuring device, a carrying bracket fixed to the plunger and provided with attaching means for attaching a plurality of instruments thereto, selective feathering means between the plunger and the carrier permitting the plunger to slide freely axially within the carrier and restraining it against rotative movement therein in any of a plurality of selective positions whereby any of said instruments may be caused to project selectively in a desired direction from the carrier.

3. Measuring apparatus comprising a blade, a carrier on said blade having a tubular portion with its axis parallel to the edges of the blade, a measuring device fixed to said carrier and extending into said tubular portion, a cylindrical plunger within the tubular portion and freeably slidable therein, resilient means urging said plunger against said measuring device, a carrying bracket fixed to the plunger and provided with attaching means for attaching a plurality of instruments angularly disposed with respect to each other about the axis of the plunger, a plurality of axially extending grooves in the plunger, and a set screw threaded through the tubular portion of the carrier and selectively engageable with any said grooves.

STEPHEN T. LESTER.

REFERENCES CITED

The following references are of record in the file of this patent:

UNITED STATES PATENTS

| Number | Name | Date |
| --- | --- | --- |
| 1,034,795 | Helwig | Aug. 6, 1912 |
| 1,887,437 | Schotthoefer | Nov. 8, 1932 |
| 2,207,625 | Lester | July 9, 1940 |
| 2,225,500 | Kelsey | Dec. 17, 1940 |
| 2,379,048 | Thomas | June 26, 1945 |

FOREIGN PATENTS

| Number | Country | Date |
| --- | --- | --- |
| 117,232 | Great Britain | July 11, 1918 |